Oct. 24, 1961  R. E. RICHARDSON  3,005,290
GLASS BENDING MOULDS

Filed March 18, 1959  3 Sheets-Sheet 1

Ronald E. Richardson
By Cushman, Darby & Cushman
Attorneys

Oct. 24, 1961 R. E. RICHARDSON 3,005,290
GLASS BENDING MOULDS
Filed March 18, 1959 3 Sheets-Sheet 2

Ronald E. Richardson
By Cushman, Darby & Cushman
Attorneys

Oct. 24, 1961 R. E. RICHARDSON 3,005,290
GLASS BENDING MOULDS
Filed March 18, 1959 3 Sheets-Sheet 3
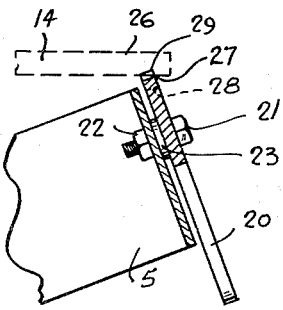
Fig. 6.
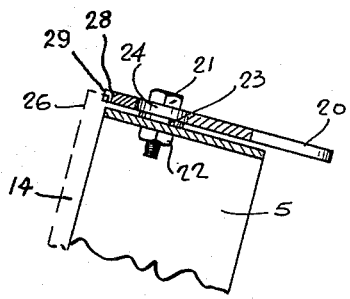
Fig. 9.
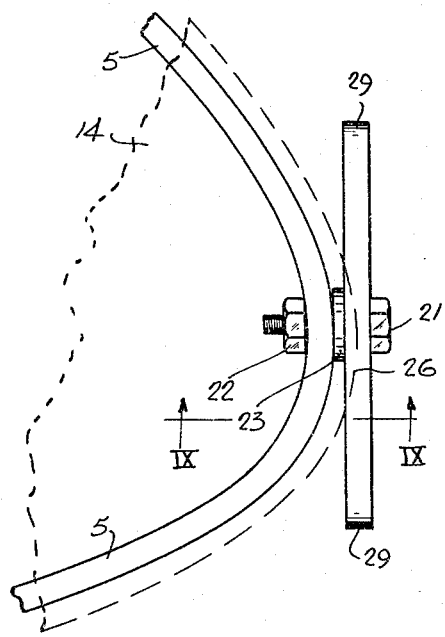
Fig. 8.
Fig. 5.
Ronald E. Richardson
By Cushman, Darby & Cushman
Attorneys United States Patent Office 3,005,290
Patented Oct. 24, 1961

3,005,290
GLASS BENDING MOULDS
Ronald E. Richardson, Oshawa, Ontario, Canada, assignor to Pittsburgh Plate Glass Company, Pittsburgh, Pa.
Filed Mar. 18, 1959, Ser. No. 800,184
Claims priority, application Canada Feb. 4, 1959
5 Claims. (Cl. 49—67)

This invention relates to improvements in the construction of moulds of the concave skeleton type that are employed in the bending of elongated glass sheets, and in particular to moulds employed in the bending of wrap-around windshields and rear windows for automobiles.

When bending glass by means of a concave mould, the flat, cold glass is placed on the mould with the majority of the glass periphery out of contact with the mould shaping surface. It is only after the glass has been softened by being passed through a hot atmosphere that it sags down to lie with its entire periphery in contact with the shaping surface. In the initial flat condition of the glass, it is supported at a relatively few spaced-apart points two of which will be constituted by the extreme end tips of the mould. These are often the only points of support. The end tips of the glass thus rest on the end tips of the mould. Since the curved distance between the end tips of the mould (that is, measured along the shaping surface) is usually greater than the straight line distance between these mould tips, which latter distance the glass spans in its cold state, some relative motion between the glass tips and the mould tips is inevitable as the bending operation proceeds, the initial overhang of each glass tip beyond its supporting mould tip being reduced.

This effect will be observed at each end of the mould, and ideally, the two glass tips should slide similarly and simultaneously over their associated mould tips. If the difference between the curved and the straight line distances that has to be taken up by sliding of the glass tips over the mould tips, is not divided equally between the two ends, the glass becomes displaced longitudinally from its correct centered position. One end of the glass may even slide completely off its supporting mould tip.

To encourage this equal distribution of the relative motion, it is desirable to ensure that the friction between the glass and the mould is substantially the same at both ends and this friction is subject to as little variation as possible with circumstances.

Difficulty has been experienced in the past with glass becoming displaced by failing to slide smoothly and uniformly over the mould tips due to unpredictable variations in the frictional characteristics; and the principal object of the present invention is the provision of a mould structure that will exhibit improvements in this regard, and, in particular, a structure that will exhibit substantially uniform frictional characteristics between the glass and the mould tips.

One half of a concave skeleton type bending mould embodying the invention is illustrated by way of example in the accompanying drawings. The other half of the mould is identical in mirror image and has thus not been illustrated.

FIGURE 5 is an enlarged plan view of FIGURE 4 taken on the line V—V in FIGURE 2;

FIGURE 6 is a section taken on the line VI—VI of FIGURE 4;

FIGURE 8 is an enlarged plan view of FIGURE 7 taken on the line VIII—VIII in FIGURE 3; and FIGURE 9 is a section taken on the line IX—IX in FIGURE 7.

Figure 1:
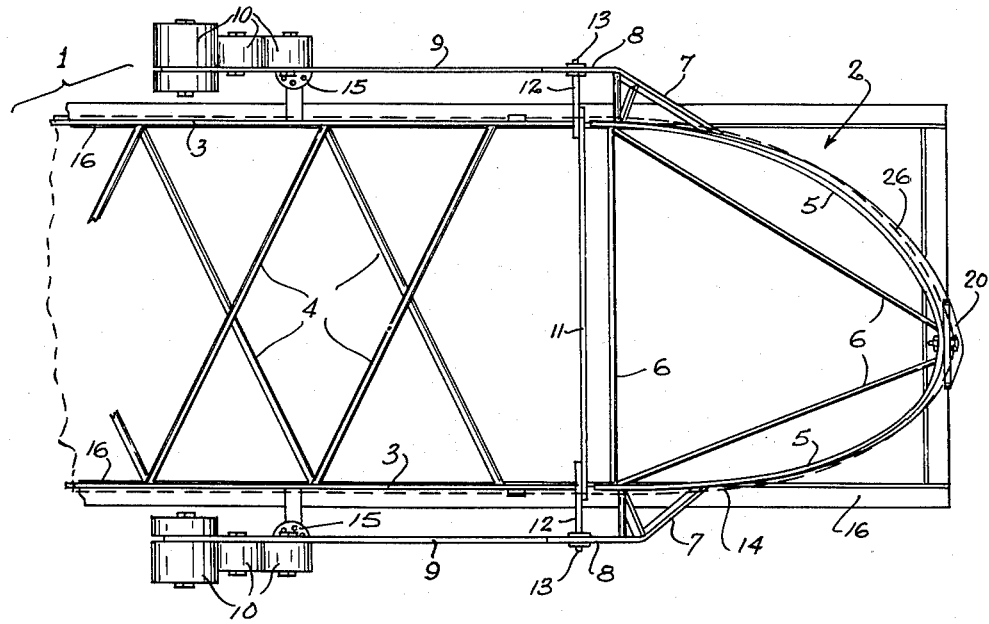
FIGURE 1 shows a plan view of the mould half in its initial "flat" position prior to bending of the glass.

The mould consists of a main mould portion 1 and a pair of movable end mould portions, the end mould portion visible in the drawing being shown at 2. The main mould portion 1 comprises side bars 3 and bracing members 4. Each end mould portion 2 comprises a curved side bar 5 and bracing members 6. In the bent position of FIGURE 3, the ends of the curved side bar 5 each form a contiguous smooth continuation of a main side bar 3. To each end of the side bar 5 there is secured by struts 7 an arched bracket 8 to which there is further secured an arm 9 extending away from the end portion 2 and carrying weights 10 on its free end. The arms 9 extend upwardly at an angle approximately equal to that to which the end mould portion 2 will pivot. A vertically disposed upstanding plate 11 extends across the mould to be secured to the end of each main side bar 3 and at each end such plate is connected to a further plate 12 which extends outwardly beyond the lateral edges of the mould. The upper edge of each plate 12 is rounded off to semi-circular cross-section and serves to define the axis about which the end portion 2 of the mould rotates, the inner apices of the brackets 8 being made similarly arcuate to form a complementary surface to turn smoothly over the upper edges of the plates 12 and form a pivotal connection therewith. Each plate 12 terminates at its outward end in an upwardly projecting finger 13, the two fingers 13 determining the transverse alignment of the end portion 2 in relation to the main mould portion 1 and thus ensuring registration of the side bars 3 and 5.

The weight and rigidity of a sheet (or two sheets) of flat, cold glass 14 when loaded on the mould will prevent upward movement of each end portion 2 against the action of the weights 10. This is the "flat" position shown in FIGURES 1 and 2. The parts will remain in this position against the force exerted by the weights 10 until the glass begins to soften as a result of the increasing temperatures that it encounters on being passed through a lehr. Gradually the upward bending force exerted by the weights 10 will take charge and the glass will allow each of the end portions 2 to swing slowly upwardly until the two arms 9 each come to rest on one of a pair of adjustable stops 15 mounted each on the outside of one of the side bars 3 of the mould. The parts will then be in the concave position illustrated in FIGURE 3 and the glass 14 will be bent to the required shape. The main mould portion 1 also includes a supporting frame 16, to which side bars 3 are connected by members 17.

The parts so far described are conventional, and the present invention is concerned with a supporting device 20 mounted at the apex of the bar 5 of each end mould portion 2. This device 20 (see now FIGS. 4 to 9) takes the form of a triangle of flat metal freely pivotally connected to the bar 5 by means of a bolt 21 and nut 22, with a washer 23 interposed between the device 20 and the bar 5, although this washer can be dispensed with. The nut and bolt assembly 21, 22 is sufficiently loose to permit the device 20 to rotate freely about the end of the bar 5, but the positioning of the bolt 21 at a point comparatively high up on the device 20 is such that it will normally take up under gravity the equilibrium position shown in FIGURE 4. The nut and bolt assembly 21, 22 provides pivot means attached to the longitudinal extremity portion of the mould and extending outwardly therefrom substantially longitudinally of the mould to provide means for pivotally attaching glass supporting member 20 relative to the longitudinal extremity portion of the mould. The device 20 is formed with a pair of holes 24 provided to minimize the thermal capacity of the upper part of the device which is in close proximity to the glass 14.

Figures 4, 7:
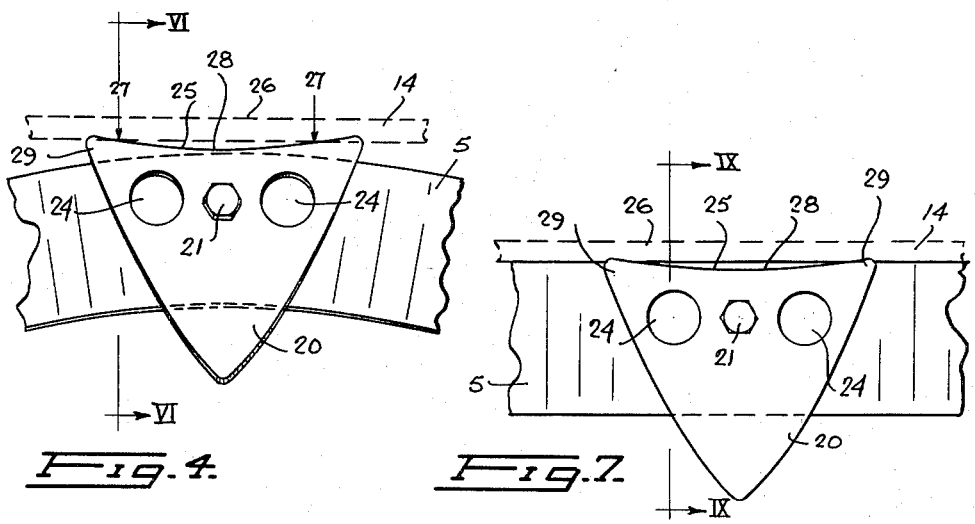
FIGURE 4 is an enlarged end view taken on the line IV—IV in FIGURE 2.
FIGURE 7 is an enlarged end view taken on the line VII—VII in FIGURE 3.

As also best seen from FIGURE 4, the upper surface 25 of the device 20 is slightly concave. As a result, in the flat position of the mould illustrated in FIGURES 1, 2, 4, 5 and 6, the end tip 26 of the glass 14 rests on the upper supporting surface 25 of the device 20 only at spaced points 27. The freedom of the supporting device 20 to tilt ensures that the glass exerts substantially the same pressure at the two points 27. The glass tip 26 is held out of contact with the central portion 28 of the surface 25 and also entirely out of contact with the bar 5 (see FIGURE 6).

Figure 2:
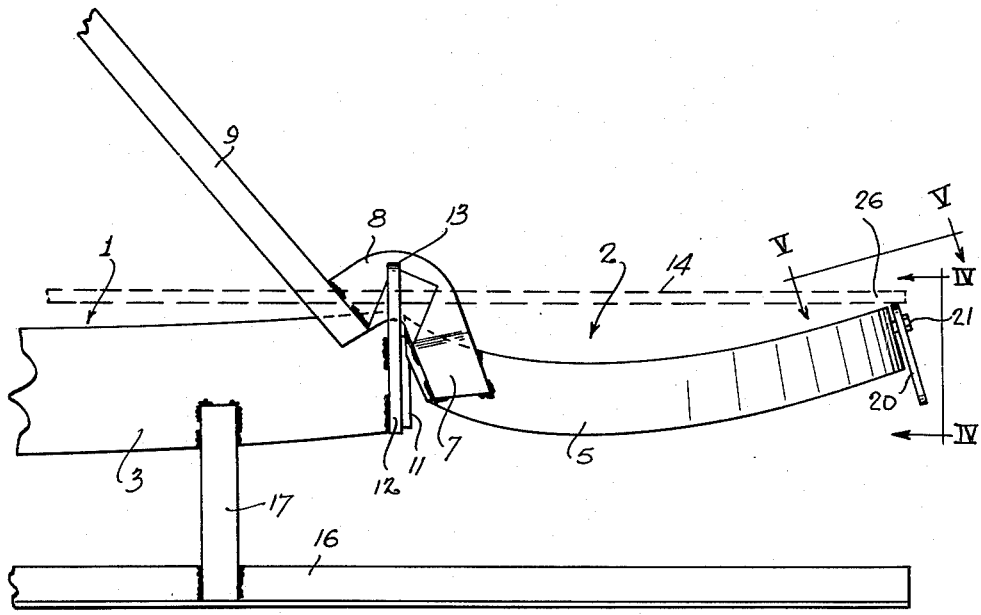
FIGURE 2 is a side view of the part of the mould half seen in FIGURE 1, with the parts in the same position.
Figure 3:
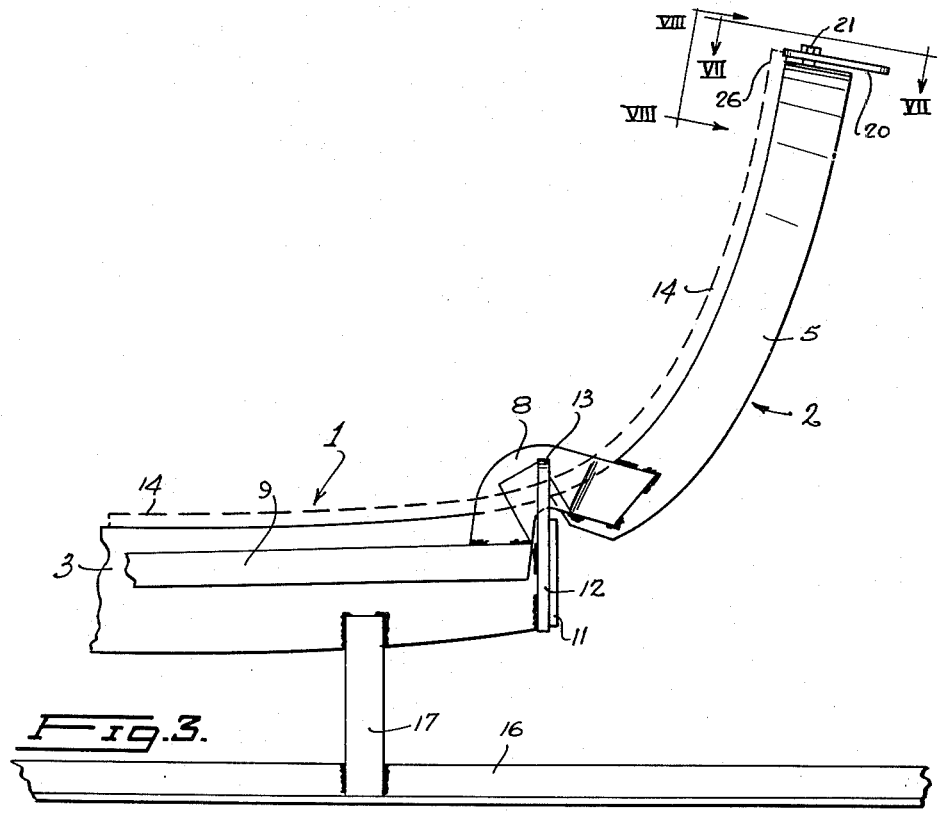
FIGURE 3 is a view similar to FIGURE 2 but with the parts shown in the curved position assumed after bending of the glass.

As the mould moves from the flat condition of FIGURE 2 to the curved condition of FIGURE 3, there will be some sliding of the end tips 26 of the glass relative to the device 20. The need for this sliding will be apparent from a comparison of the comparatively large overhang of the tip 26 beyond the bar 4 seen in FIGURES 5 and 6 with the very slight overhang of the tip 26 beyond the edge of the bar 5 in the curved position of FIGURES 8 and 9. As the mould moves from its open to its curved position, the glass must slide inwardly at both ends as it conforms to the mould shaping surface.

As stated, the glass initially bears on the upper supporting surface 25 of the device 20 at the two spaced points 27. The fact that these are discrete points and that there is not a large area of contact between the glass and the supporting surface 25 is advantageous in that it reduces any tendency of the glass to stick to the metal and to fail to slide smoothly over the supporting surface 25. As the sliding movement continues, the points of support 27 move towards one another inwardly to the central area 28 of the surface 25, until finally, due both to this movement and to the fact that the glass has now come to lie against the bar 5 (in contrast to an inclination to such bar—compare FIGS. 6 and 9) causes the tip 26 to lose contact with the device 20 altogether, at a time near the end of the bending process, and to lie in contact only with the bar 5. Whereas in the position of FIGS. 4 and 6, the whole upper supporting surface 25 of the device 20 projects above the bar 5 in the horizontal plane in which the glass sheet 14 lies, in the position of FIGS. 7 and 9, the central area 28 of the surface 25 lies below the plane in which the glass sheet 14 lies, that is the plane of the upper edge of the bar 5. FIGURE 7 shows that, even in this latter position, the end tips 29 of the device 20 still project above the upper edge of the bar 5, but it will be apparent from FIGURE 8 that these tips 29 are disposed well outwardly of the glass tip 26 now that the latter has moved more inwardly of the mould. In a case where a greater glass overhang is found desirable at the end of the process, the device 20 could be mounted in a slightly lower position on the bar 5 so that not even its tips 29 will project above the upper edge of the shaping bar 5 in this final curved position of the mould.

The present invention is not restricted in its application to a multi-part mould having relatively movable parts. It is equally applicable to a mould having a fixed shaping surface of concave contour, onto which the glass sags on heating, without any bending forces being exerted directly by the mould. The essential requirement for the supporting devices that are provided at the two ends of the mould in accordance with the present invention is that, in the unbent positions of mould and glass, each such supporting device provides a supporting surface (preferably a concave surface) that projects beyond the mould shaping surface into contact with the underside of the glass to support the same out of contact with the mould shaping surface, whereas, in the bent positions of mould and glass, the underside of the glass rests on the mould shaping surface. In the embodiment of the invention illustrated the glass rests solely on the mould shaping surface, that is it is out of contact with the supporting devices in the bent condition. This arrangement is convenient but not essential. The important requirement is that in the bent condition the glass should rest principally on the mould shaping surface; if it also touches the supporting device, this will not normally be any disadvantage.

I claim:

1. A skeleton type glass bending mould comprising an elongated shaping surface defining a concave contour and having a longitudinal extremity portion including a pointed longitudinal extremity, pivot means attached to said longitudinal extremity portion and extending outwardly from said pointed longitudinal extremity substantially longitudinally of the mould, and a glass supporting member pivotally attached to said longitudinal extremity portion about said pivot means, said glass supporting member having an upper edge including space uppermost portions located longitudinally outwardly, above and flanking said pointed longitudinal extremity and an intermediate portion located longitudinally outwardly of and below said longitudinal extremity.

2. A skeleton type glass bending mould comprising an elongated shaping surface defining a concave contour and having two longitudinal extremity portions each including a pointed longitudinal extremity, a pair of pivot means one attached to each of said longitudinal extremity portions and extending outwardly from the pointed longitudinal extermity of said one of said longitudinal extremity portions substantially longitudinally of the mould, and a pair of glass supporting members one pivotally attached to each of said longitudinal extremity portions about one of said pivot means, each of said glass supporting members having an upper edge including spaced uppermost portions located longitudinally outwardly, above and flanking the pointed longitudinal extremity adjacent thereto and an intermediate portion located longitudinally outwardly of and below the longitudinal pointed extremity adjacent thereto.

3. A skeleton type glass bending mould comprising an elongated shaping surface defining a concave contour and having a longitudinal extremity portion including a pointed longitudinal extremity, pivot means attached to said longitudinal extremity portion and extending outwardly from said pointed longitudinal extremity substantially longitudinally of the mould, and a glass supporting member pivotally attached to said longitudinal extremity portion about said pivot means, said glass supporting member having an upper edge including spaced uppermost portions located longitudinally outwardly, above and flanking said pointed longitudinal extremity and an intermediate portion located longitudinally outwardly of and below said longitudinal extremity, and said glass supporting member having holes therein adjacent said upper edge.

4. In a glass bending mould of the concave type having a main mould portion and a pair of end mould portions pivotally connected to opposite ends of said main mould portion to be movable between a "flat" position and a concave position, each of said end mould portions including a pointed longitudinal extremity; a pair of pivot means one attached to each of said longitudinal extremity portions and extending outwardly from the pointed longitudinal extremity of said one of said longitudinal extremity portions substantially longitudinally of the mould, and a pair of glass supporting members one pivotally attached to each of said longitudinal extremity portions about one of said pivot means, each of said glass supporting members having an upper edge including spaced uppermost portions located longitudinally outwardly, above and flanking the pointed longitudinal extremity adjacent thereto and an intermediate portion located longitudinally outwardly of and below the longitudinal pointed extremity adjacent thereto.

5. In a glass bending mould of the concave type having a main mould portion and a pair of end mould portions pivotally connected to opposite ends of said main mould portion each about pivot means extending transversely of the length of the mould to be movable between a "flat" position and a concave position, each of said end mould portions including a pointed longitudinal extremity; a pair of pivot means one attached to each of said longitudinal extremity portions and extending outwardly from the pointed longitudinal extremity of said one of said longitudinal extremity portions substantially longitudinally of the mould, and a pair of glass supporting members one pivotally attached to each of said longitudinal extremity portions about one of said pivot means, each of said glass supporting members having an upper edge including spaced uppermost portions located longitudinally outwardly, above and flanking the pointed longitudinally extremity adjacent thereto and an intermediate portion located longitudinally outwardly of and below the longitudinal pointed extremity adjacent thereto.

References Cited in the file of this patent

UNITED STATES PATENTS

| | | |
|---|---|---|
| 2,379,213 | Black | June 26, 1945 |
| 2,379,244 | Minton | June 26, 1945 |
| 2,518,951 | Smith | Aug. 15, 1950 |
| 2,537,803 | Walters | Jan. 9, 1951 |
| 2,608,799 | Babcock | Sept. 2, 1952 |
| 2,744,359 | Jendrisak | May 8, 1956 |
| 2,774,189 | Jendrisak | Dec. 18, 1956 |
| 2,798,338 | Jendrisak | July 9, 1957 |
| 2,814,164 | Carson et al. | Nov. 26, 1957 |
| 2,827,738 | McKelvey | Mar. 25, 1958 |
| 2,861,395 | Richardson | Nov. 25, 1958 |

FOREIGN PATENTS

| | | |
|---|---|---|
| 784,115 | Great Britain | Oct. 2, 1957 |

UNITED STATES PATENT OFFICE
CERTIFICATE OF CORRECTION

Patent No. 3,005,290            October 24, 1961

Ronald E. Richardson

It is hereby certified that error appears in the above numbered patent requiring correction and that the said Letters Patent should read as corrected below.

Column 3, line 24, for "bar 4" read -- bar 5 --; column 4, line 33, for "extermity" read -- extremity --; column 5, line 20, for "longitudinally" read -- longitudinal --.

Signed and sealed this 23rd day of October 1962.

(SEAL)
Attest:

ERNEST W. SWIDER
Attesting Officer

DAVID L. LADD
Commissioner of Patents